US012797986B2

(12) United States Patent
Bae

(10) Patent No.: US 12,797,986 B2
(45) Date of Patent: Nov. 17, 2026

(54) WELDING MEMBER HAVING EXCELLENT WELD FATIGUE CHARACTERISTICS

(71) Applicant: POSCO CO., LTD, Pohang-si (KR)

(72) Inventor: Gyu-Yeol Bae, Yeonsu-gu (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/994,123

(22) PCT Filed: Mar. 27, 2023

(86) PCT No.: PCT/KR2023/003993

§ 371 (c)(1),
(2) Date: Jan. 14, 2025

(87) PCT Pub. No.: WO2024/177193

PCT Pub. Date: Aug. 29, 2024

(65) Prior Publication Data

US 2026/0027638 A1 Jan. 29, 2026

(30) Foreign Application Priority Data

Feb. 21, 2023 (KR) ........................ 10-2023-0022588

(51) Int. Cl.
*B23K 9/02* (2006.01)
*C22C 38/00* (2006.01)
(Continued)

(52) U.S. Cl.
CPC .............. *B23K 9/02* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/26* (2013.01); *C22C 38/28* (2013.01); *C22C 38/38* (2013.01); *C22C 38/42* (2013.01); *C22C 38/44* (2013.01); *C22C 38/50* (2013.01); *C22C 38/54* (2013.01); *C22C 38/58* (2013.01);
(Continued)

(58) Field of Classification Search
None
See application file for complete search history.

(56) References Cited

U.S. PATENT DOCUMENTS

2019/0388995 A1 12/2019 Kodama et al.
2022/0220595 A1 * 7/2022 Otsuka .................... C22C 38/02
(Continued)

FOREIGN PATENT DOCUMENTS

EP 3950996 A1 2/2022
JP H03-133576 A 6/1991
(Continued)

OTHER PUBLICATIONS

Korean Decision to Grant dated Oct. 30, 2025 issued in Korean Patent Application No. 10-2023-0022588 (with English translation).
(Continued)

*Primary Examiner* — Elizabeth Collister
(74) *Attorney, Agent, or Firm* — Morgan Lewis & Bockius LLP

(57) ABSTRACT

A welding member having excellent weld fatigue characteristics is provided. The present disclosure can provide a gas shielded arc welding member that can secure excellent fatigue characteristics in an automotive industry.

8 Claims, 1 Drawing Sheet

(51) Int. Cl.

| | |
|---|---|
| ***C22C 38/02*** | (2006.01) |
| ***C22C 38/04*** | (2006.01) |
| ***C22C 38/06*** | (2006.01) |
| ***C22C 38/12*** | (2006.01) |
| ***C22C 38/14*** | (2006.01) |
| ***C22C 38/22*** | (2006.01) |
| ***C22C 38/26*** | (2006.01) |
| ***C22C 38/28*** | (2006.01) |
| ***C22C 38/38*** | (2006.01) |
| ***C22C 38/42*** | (2006.01) |
| ***C22C 38/44*** | (2006.01) |
| ***C22C 38/50*** | (2006.01) |
| ***C22C 38/54*** | (2006.01) |
| ***C22C 38/58*** | (2006.01) |
| *B23K 35/02* | (2006.01) |
| *B23K 35/30* | (2006.01) |
| *B23K 101/00* | (2006.01) |

(52) U.S. Cl.

CPC ...... *B23K 35/0261* (2013.01); *B23K 35/3093* (2013.01); *B23K 2101/006* (2018.08)

(56) References Cited

U.S. PATENT DOCUMENTS

| | | | |
|---|---|---|---|
| 2022/0266389 | A1 | 8/2022 | Otto |
| 2023/0105155 | A1 | 4/2023 | Bae et al. |

FOREIGN PATENT DOCUMENTS

| | | | |
|---|---|---|---|
| JP | 2002-309336 | A | 10/2002 |
| JP | 2010-046714 | A | 3/2010 |
| JP | 2019-118274 | A | 7/2019 |
| JP | 2021-049571 | A | 4/2021 |
| JP | 2021-049572 | A | 4/2021 |
| JP | 2021-074740 | A | 5/2021 |
| JP | 2021-183342 | A | 12/2021 |
| JP | 2021-188088 | A | 12/2021 |
| JP | 2022-105363 | A | 7/2022 |
| KR | 10-2013-0070751 | A | 6/2013 |
| KR | 10-2015-0108930 | A | 9/2015 |
| KR | 10-2019-0103244 | A | 9/2019 |
| KR | 10-2021-0031511 | A | 3/2021 |
| KR | 10-2311581 | B1 | 10/2021 |
| KR | 10-2022-0087871 | A | 6/2022 |
| WO | 2022/131652 | A1 | 6/2022 |

OTHER PUBLICATIONS

Korean Office Action dated May 31, 2025 issued in Korean Patent Application No. 10-2023-0022588 (with English translation).

International Search Report issued in corresponding International Patent Application No. PCT/KR2023/003993 dated Nov. 8, 2023.

Extended European Search Report dated Oct. 27, 2025 issued in the corresponding European Patent Application No. 23924302.5. (Note: JP 2022-105363 A already submitted.).

Office Action dated Jul. 22, 2025 issued in the corresponding Japanese Patent Application No. 2025-502556 with the English translation. (Note: JP 2022-105363 A already submitted.)

Japanese Decision to Grant dated Oct. 13, 2026 issued in Japanese Patent Application No. 2025-502566 (with English translation).

* cited by examiner

WELDING MEMBER HAVING EXCELLENT WELD FATIGUE CHARACTERISTICS

CROSS-REFERENCE OF RELATED APPLICATIONS

This application is the U.S. National Phase under 35 U.S.C. § 371 of International Patent Application No. PCT/KR2023/003993, filed on Mar. 27, 2023, which in turn claims the benefit of Korean Application No. 10-2023-0022588, filed on Feb. 21, 2023, the disclosures of which applications are incorporated by reference herein.

TECHNICAL FIELD

The present disclosure relates to a welding member having excellent weld fatigue characteristics, and more specifically, to a gas shielded arc welding zone that may secure excellent durability and economic efficiency, which are required in manufacturing components.

BACKGROUND ART

In the automobile field, research into technology to reduce the weight of bodies and components of a vehicle is emerging as a major issue due to fuel efficiency regulation policies in line with environmental protection, such as global warming issues or the like. Chassis components, which may be important for driving performance of the vehicle, also need to feature high-strength steel materials to reduce weight in accordance with this trend.

In order to achieve such a reduction in weight of the components, it is essential to increase strength of the materials, and guaranteeing durability of components formed of high-strength steel materials in an environment to which repeated fatigue loads are applied may be an important factor.

However, in arc welding to be mainly used to secure strength when assembling chassis components of the vehicle, lap joint welding between components may be performed by welding with welding wires, so it may be inevitable to provide a geometric shape to a joint portion. This acts as a repetitive fatigue stress concentration portion (notch effect) and becomes the starting point of fracture, resulting in a decrease in durability of the components, which have the limitation of losing the advantage of applying high-strength steel materials.

Therefore, in order to improve fatigue characteristics of a weld zone, it is most important to reduce an angle (toe angle) of a bead end portion, which may be a main stress concentration portion, and in addition, controlling material and stress of a toe portion may be an important factor. In addition, as mentioned above, the demand for rust prevention to prevent penetrating corrosion has increased due to thinning of materials due to the trend of high strength and a decrease in weight of components, and adoption of plated steel materials is increasing. However, in particular, since a plating layer does not exist in a weld metal of arc welds, there may be a limitation of deteriorating corrosion resistance after painting, as compared to a base material. Accordingly, there may be a problem that leads to early corrosion of weld zones of chassis components formed of plated steel materials in a harsh corrosive environment when driving a vehicle and a decrease in fatigue characteristics. Meanwhile, during gas shield arc welding of plated steel, a large number of pore defects of pits and blowholes may occur in a weld bead due to generation of zinc and other vapors, which may lead to a decrease in strength of a weld zone, which may be a problem of reduced welding productivity. In addition, in general uncoated steel materials, since slag generated in the weld bead during gas shield arc welding may cause painting defects and reduce corrosion resistance after painting, there may be a problem with rising costs due to post-treatment processes such as pickling or brushing to remove the slag after welding when manufacturing components.

Recently, the development of lightweight chassis components for next-generation eco-friendly vehicles may be actively underway, and in particular, the development of welding technology that may improve the characteristics of welded zones while ensuring economic feasibility has become an important issue.

SUMMARY OF INVENTION

Technical Problem

The purpose of the present disclosure is to provide a gas shielded arc welding member that may secure excellent fatigue characteristics in the automobile industry.

The object of the present disclosure is not limited to the above-mentioned matters. The additional problems of the present disclosure are described throughout the specification, and those skilled in the art will have no difficulty in understanding the additional problems of the present disclosure from the content described in the specification of the present disclosure.

Solution to Problem

According to an aspect of the present disclosure, a welding member having excellent weld fatigue characteristics, includes:

a base material; and a weld zone, wherein the weld zone includes, by weight, C: 0.001 to 0.30%, Si: 1.00% or less (excluding 0%), Mn: 0.50 to 3.00%, P: 0.030% or less (excluding 0%), S: 0.030% or less (excluding 0%), Cr: 1.50% or less (excluding 0%), Mo: 0.60% or less (excluding 0%), Al: less than 0.10% (excluding 0%), Ni: 0.40% or less (excluding 0%), Ti: less than 0.10% (excluding 0%), a balance of Fe, and inevitable impurities, and satisfies the following relationship 1, and wherein a weld bead shape of the weld zone satisfies the following relationship 2:

$$0.30 \leq [Si] + 0.25 \times ([Mn] + [Cr]) \leq 0.66 \quad \text{[Relationship 1]}$$

(where [Si], [Mn], and [Cr] represent amounts in weight percent of each element in parentheses for the weld zone.)

$$e1/b2 \leq 0.35 \quad \text{[Relationship 2]}$$

(where, as illustrated in FIG. 1, e1 represents a distance from a point at which a line connected from a weld root of a lap joint weld zone in a direction, perpendicular to a lower plate, and a line connected from a weld toe of the lower plate, meet each other, to a weld toe of an upper plate, and b2 represents a distance from the weld toe of the lower plate to the weld root.)

The weld bead shape of the weld zone further satisfies the following relationship 3:

$$\theta 2-\theta 1\geq 34°\quad\text{[Relationship 3]}$$

(where, as illustrated in FIG. 2, θ1 represents an internal angle formed by a line parallel to an upper reference surface of the lower plate, and a line connecting the weld toe of the lower plate and the weld toe of the upper plate, and θ2 represents an internal angle formed by a line parallel to a lower reference surface of the upper plate of the lap joint weld zone, and a line connecting the weld root to the weld toe of the upper plate.)

The weld zone may further include, by weight, one or more of Nb: 0.10% or less, V: 0.10% or less, Zr: 0.10% or less, and B: 0.01% or less.

The weld zone may further include, by weight, Cu: 0.50% or less.

The weld zone may satisfy a fatigue lifespan of 245,000 cycles or more at a maximum load of 10.1 kN (a ratio of a minimum load to a maximum load of 0.1 and a repetitive loading frequency of 15 Hz).

The base material may include, by weight, C: 0.04 to 0.18%, Si: 2.0% or less (including 0%), Mn: 0.5 to 3.0%, Cr: 2.0% or less (including 0%), Mo: 2.0% or less (including 0%), Al: 0.01 to 0.10%, P: 0.05% or less (excluding 0%), S: 0.05% or less (excluding 0%), a balance of Fe, and inevitable impurities.

The base material may further include, by weight, one or more of Ti: 0.20% or less, Nb: 0.10% or less, and Cu: 0.10% or less.

The base material may have a thickness of 0.8 to 4.0 mm.

In addition, another aspect of the present disclosure relates to:

an automotive component having the welding member.

Advantageous Effects of Invention

According to the present disclosure described above, as a next-generation welding technology that secures performance/cost competitiveness in line with era of popularization of electric vehicles, it is possible to effectively provide a gas shielded arc welding zone having excellent weld fatigue characteristics.

Various advantages and effects of the present disclosure are not limited to the above-described contents, and can be more easily understood through description of specific embodiments of the present disclosure.

BEST MODE FOR INVENTION

Figure 1:
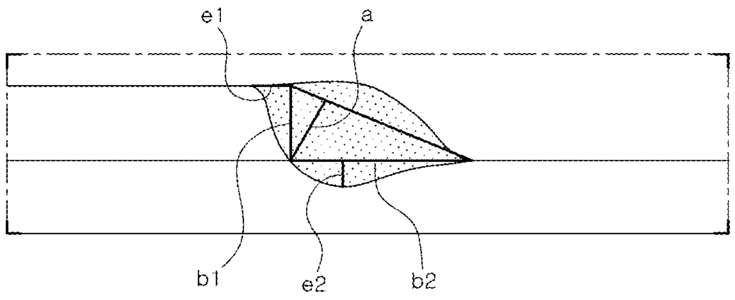
FIG. 1 is a view illustrating factors for specifying a weld bead shape of a lap joint weld zone obtained by lap joint welding of a steel plate in an embodiment of the present disclosure.

Hereinafter, the present disclosure will be described.

The present disclosure may be characterized by controlling Si, Mn, and Cr amounts of a weld zone to ensure excellent fatigue characteristics of the weld zone. As a result of controlling the amounts of these elements, in gas shielded arc welding, which may be usually controlled by constant voltage, a position having a maximum penetration depth may move from an outside of a lower plate (weld toe direction) toward a weld root at which an upper plate and the lower plate meet a weld metal, by flow of current through an arc column between a tip of a welding wire and a molten metal, e.g., by strengthening an arc force, to obtain an effect of improving low-cycle fatigue lifespan in which relatively high fatigue load is applied. In this case, the low-cycle fatigue lifespan may be defined as less than 245,000 cycles, and cases equal to or more than this value may be defined as high-cycle fatigue lifespan.

In addition, by controlling Si, Mn, and Cr amounts of a weld zone, as described above, the present disclosure may control a weld bead of the weld zone to have a predetermined shape to lower susceptibility to fatigue failure in a weld root and toe of the lap joint weld zone, to obtain an effect of improving low-cycle/high-cycle fatigue lifespan of the weld zone, and, at the same time, to lower susceptibility to fatigue failure in the weld toe, to obtain an effect of further improving high-cycle fatigue lifespan of a relatively low fatigue load.

First, a welding member according to an aspect of the present disclosure will be described. The welding member of the present disclosure may include a base material and a weld zone. In this case, an alloy composition of the weld zone will be described first. Amounts of the alloy composition described below refers to % by weight.

C: 0.001~0.30%

The C may be a major element which can lower a temperature at which transformation of acicular ferrite, bainite, and martensite is initiated through non-diffusion transformation as welding metal is continuously cooled in a high-temperature austenite phase during a solidification process. When an amount of C is less than 0.001%, not only does hardenability decrease, making it difficult to secure sufficient strength of a weld metal, but also a low-temperature transformation initiation temperature may not be sufficiently lowered according to the above-mentioned principle. Therefore, effect of offsetting tensile residual stress in the weld zone due to a low-temperature transformation expansion effect during a cooling process may be significantly reduced, and a high-angle grain boundary structure with a large azimuth angle difference between grains may not be formed. When the C amount exceeds 0.30%, not only does viscosity of molten metal decrease, resulting in a poor bead shape, but it also hardens welding metal excessively, resulting in a decrease in toughness.

Si: 1.00% or less (excluding 0%)

The Si may be is an element promoting deoxidation of molten metal during arc welding (a deoxidizing element), and an element in advantageous in suppressing an occurrence of blowholes, and increasing a low-temperature transformation initiation temperature. When the Si amount exceeds 1.00%, a large amount of non-conductive slag may be generated, which may cause coating defects in the weld zone, and insufficient surface activation of the zone may be insufficient due to excessive deoxidation, which may reduce the penetrability of molten metal. Therefore, in the present disclosure, it is desirable to control the Si amount to 1.00% or less. The Si amount is preferably 0.75% or less, more preferably 0.50% or less, and most preferably 0.25% or less.

Mn: 0.50~3.00%

The Mn may be a deoxidizing element, and may be an element advantageous in suppressing occurrence of blowholes by promoting deoxidation of molten metal during arc welding, and, like C, may be an element reducing a low-temperature transformation initiation temperature. When an Mn amount is less than 0.5%, there may be a disadvantage in that a deoxidation effect is insufficient and blowholes are easily generated. When the Mn amount exceeds 3.0%, viscosity of the molten metal becomes excessively high, so when the welding speed is high, may be fast, molten metal cannot properly flow into a welded portion, so a humping bead may be formed such that it is easy to occur bead shape defects. More preferably, the Mn amount is limited to 2.50% or less.

Cr: 1.50% or Less (Excluding 0%)

Cr may be a ferrite stabilizing element, and may be an element advantageous for lowering a low-temperature transformation initiation temperature and improving strength by securing hardenability of the weld metal. When the Cr amount exceeds 1.50%, brittleness of the weld metal may increase unnecessarily in some cases, making it difficult to secure sufficient toughness. The Cr amount is preferably 1.40% or less, more preferably 1.30% or less, and most preferably 1.20% or less.

Mo: 0.60% or Less (Excluding 0%)

The Mo may be a ferrite stabilizing element, and may be an element advantageous in securing hardenability to improve strength of the weld metal. When the Mo amount exceeds 0.60%, there may be a disadvantage in that toughness of the weld metal deteriorates in some cases.

P: 0.030% or Less (Excluding 0%)

The P may be an element which is generally mixed as an unavoidable impurity in steel, and may be also an element that may be included as a normal impurity in solid wire for arc welding. When the P amount exceeds 0.030%, there may be a disadvantage in that high-temperature cracking of the weld metal becomes more noticeable.

S: 0.030% or Less (Excluding 0%)

The S may be an element which is generally mixed as an unavoidable impurity in steel, and may be also an element contained as a normal impurity in solid wire for arc welding. When the S amount exceeds 0.030%, there may be disadvantages in that toughness of the weld metal deteriorates in some cases, and surface tension of the molten metal becomes insufficient during welding, causing it to melt due to gravity during high-speed downward welding (welding from top to bottom during vertical welding), resulting in a poor shape of weld bead due to excessive flow.

Al: Less than 0.10% (Excluding 0%)

The Al may be a deoxidizing element that can improve the strength of welding metal by promoting deoxidation of molten metal during arc welding even in a small amount of Al. To secure the above-described effect, 0% is excluded as a lower limit of the Al amount. When the Al amount is 0.10% or more, production of Al-based oxides increases, which in some cases reduces the strength and toughness of the weld metal, and may have the disadvantage of becoming sensitive to electrodeposition coating defects in the weld zone due to non-conductive oxides. More preferably, the Al amount is limited to less than 0.07%.

Ti: Less than 0.10% (Excluding 0%)

The Ti may be a deoxidizing element that may improve strength of the weld metal by promoting deoxidation of the molten metal during arc welding even in a small amount. It also facilitates development of acicular ferrite, which may improve toughness of the weld zone. To ensure the above-mentioned effect, 0% may be excluded as the lower limit of Ti amount. When the Ti amount 0.10% or more, production of Ti-based oxide may increase, which may have the disadvantage of lowering the strength and toughness of the weld metal in some cases. More preferably, the Ti amount is limited to less than 0.07%.

Ni: 0.40% or Less (Excluding 0%)

The Ni may be an element that may improve strength and toughness of weld metal. To ensure the above-mentioned effect, 0% may be excluded as a lower limit of Ni amount. When the Ni amount exceeds 0.40%, there may be a disadvantage of becoming sensitive to cracking, so the Ni amount may be set to 0.40% or less. The Ni amount is preferably 0.30% or less, more preferably 0.20% or less, and most preferably 0.10% or less.

Although not particularly limited, according to an embodiment of the present disclosure, the welding member may optionally further include, by weight: Nb: 0.10% or less, V: 0.10% or less, Zr: 0.10% or less, and B: 0.01% or less.

Nb: 0.10% or Less

The Nb may be an element that may improve strength and toughness of the weld metal by increasing hardenability and densifying a microstructure thereof. In addition, it may have an effect of improving flow of molten metal and stabilizing an arc during arc welding. When the Nb amount exceeds 0.10%, there may be a disadvantage in that low-melting point compounds may be formed at grain boundaries, making high-temperature cracks more likely to occur.

V: 0.10% or Less

The V may be an element that may improve strength and toughness of the weld metal by increasing hardenability and densifying a microstructure thereof. In addition, it a precipitation strengthening element that may improve the strength of weld metal by generating carbonitride. When the V amount exceeds 0.10%, there may be a disadvantage in that toughness of the weld metal may be reduced in some cases due to excessive strength due to excessive precipitates. Therefore, the V amount may be set to 0.10% or less.

Zr: 0.10% or Less

Zr may be an element that promotes deoxidation of molten metal during arc welding (deoxidizing element), and may be an element advantageous in suppressing the occurrence of blowholes. When the Zr amount exceeds 0.10%, there may be a disadvantage in that electrodeposition paintability of the weld zone deteriorates. Therefore, the Zr amount may be set to 0.10% or less.

B: 0.01% or Less

The B may be an element that may improve strength of the weld metal by increasing hardenability. When the B amount exceeds 0.01%, there may be a disadvantage in that toughness of the weld metal deteriorates in some cases due to excessive hardenability. Therefore, the B amount may be set to 0.01% or less.

In addition, although not particularly limited, according to an embodiment of the present disclosure, the welding member may optionally further include, by weight, Cu: 0.50% or less.

Cu: 0.50% or Less

The Cu may be an element effective in improving the strength of weld metal. When the Cu amount exceeds 0.50%, there may be a disadvantage in that cracking susceptibility of the weld metal increases. The Cu amount is preferably 0.45% or less, more preferably 0.40% or less, and most preferably 0.30% or less. To sufficiently obtain a strength improvement effect, 0.01% or more of Cu may be contained in the weld metal.

In addition, the remaining component of the present disclosure may be iron (Fe). However, since in the common manufacturing process, unintended impurities may be inevitably incorporated from raw materials or the surrounding environment, the component may not be excluded. Since these impurities are known to any person skilled in the common manufacturing process, the entire contents thereof are not particularly mentioned in the present specification.

Relationship 1

The present disclosure may also control Si, Mn, and Cr amounts to satisfy the following relationship 1. As a result of controlling the amounts of these elements, in gas shielded arc welding, which may be usually controlled by constant voltage, a position having a maximum penetration depth may move from an outside of a lower plate (weld toe direction) toward a weld root at which an upper plate and the lower plate meet a weld metal, by flow of current through an arc column between a tip of a welding wire and a molten metal, e.g., by strengthening an arc force, to obtain an effect of improving low-cycle fatigue lifespan in which relatively high fatigue load is applied. In this case, the low-cycle fatigue lifespan may be defined as less than 245,000 cycles, and cases equal to or more than this value may be defined as high-cycle fatigue lifespan. When a value defined by the following relationship 1 is less than 0.30, despite the above-mentioned effect, occurrence of porosity defects in the weld zone becomes sensitive due to lack of deoxidation of the weld zone, which may lead to a problem of lowering the fatigue strength of the weld zone. When the value exceeds 0.66, a problem may arise where it may be difficult to control the position with the maximum penetration depth in the above-described lap joint weld zone to move toward the weld root. More preferably, the Si, Mn and Cr amounts may be controlled such that the value defined by the following relationship 1 satisfies 0.35 to 0.60.

$$0.30 \leq [Si] + 0.25 \times ([Mn] + [Cr]) \leq 0.66 \quad \text{[Relationship 1]}$$

(where [Si], [Mn], and [Cr] represent amounts in weight percent of each element in parentheses for the weld zone.)

The weld bead of the weld zone forming the weld member of the present disclosure may have a predetermined shape. Specifically, it is desirable to control the welding ratio of the weld zone to a value defined by the following relationship 2 to 0.35 or less.

$$e1/b2 \leq 0.35 \quad \text{[Relationship 2]}$$

(where, as illustrated in FIG. 1, e1 represents a distance from a point at which a line connected from a weld root of a lap joint weld zone in a direction, perpendicular to a lower plate, and a line connected from a weld toe of the lower plate, meet each other, to a weld toe of an upper plate, and b2 represents a distance from the weld toe of the lower plate to the weld root.)

The reason for limiting the weld bead shape of the lap joint weld obtained by welding in the present disclosure as illustrated in relationship 2 above may be that, based on the principle of relationship 1 described above, the position with the maximum penetration depth in the lap joint weld may appropriately move from the outside of the lower plate (weld toe direction) toward the weld root, to lower sensitivity to fatigue failure at the weld root, and at the same time, when the value of e1 in relationship 2 is lower than the value of b2 by an appropriate ratio, to effectively improve high-cycle fatigue lifespan of relatively low fatigue load while preventing fatigue failure at the weld toe. When the value defined by relationship 2 exceeds 0.35, the fatigue failure of the weld toe becomes sensitive at a relatively low fatigue load, which may cause the problem of shortened high-cycle fatigue lifespan. More preferably, the value defined by relationship 2 above may be managed to be 0.30 or less.

Furthermore, in the present disclosure, it is more preferable that the weld bead shape of the weld zone may be formed to satisfy the following relationship 3.

$$\theta 2 - \theta 1 \geq 34° \quad \text{[Relationship 3]}$$

Figure 2:
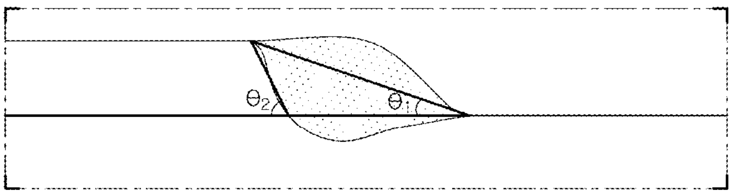
FIG. 2 is another view illustrating factors for specifying a weld bead shape of a lap joint weld zone obtained by lap joint welding of a steel plate in an embodiment of the present disclosure.

(where, as illustrated in FIG. 2, θ1 represents an internal angle formed by a line parallel to an upper reference surface of the lower plate, and a line connecting the weld toe of the lower plate and the weld toe of the upper plate, and θ2 represents an internal angle formed by a line parallel to a lower reference surface of the upper plate of the lap joint weld zone, and a line connecting the weld root to the weld toe of the upper plate.)

The reason for controlling the weld bead shape, as illustrated in relationship 3 above may be to improve the low-cycle/high-cycle fatigue lifespan of the weld zone by lowering susceptibility to fatigue failure at the weld root and toe of the lap joint weld according to the principles of relationships 1 and 2 described above. At the same time, the purpose may be to further reduce fatigue failure susceptibility in the weld toe and further improve high-cycle fatigue lifespan under relatively low fatigue load. When the value of θ2 decreases, a fatigue stress concentration may decrease at the weld root, but a fatigue stress concentration may increase at the weld toe. When the value of θ1 decreases, the fatigue stress concentration may decrease at the weld toe, but the fatigue stress concentration may increase at the weld root. Therefore, when the values defined by relationships 1 and 2 above are controlled to an appropriate value according to the above-mentioned principle, and the value defined by relationship 3 may be controlled to 34° or more, it was discovered through research of the present disclosure that low-cycle/high-cycle fatigue lifespan of the lap joint weld zone may be effectively improved at the same time. When the value defined by relationship 3 above is less than 34°, a problem may occur in which the high-cycle fatigue lifespan becomes shorter even though the low-cycle fatigue lifespan of the weld zone increases.

In the present disclosure, an alloy composition of the base material is not particularly limited. However, as an example, the base material may include, by weight: C: 0.04 to 0.18%, Si: 2.0% or less (including 0%), Mn: 0.5 to 3.0%, Cr: 2.0% or less (including 0%), Mo: 2.0% or less (including 0%), Al: 0.01 to 0.10%, P: 0.05% or less (excluding 0%), S: 0.05% or less (excluding 0%), a balance of Fe, and inevitable impurities. In addition, the base material may optionally further include one or more of Ti: 0.20% or less (including 0%), Nb: 0.10% or less (including 0%), and Cu: 0.10% or less (including 0%). In addition, the base material may have a thickness of 0.8 to 4.0 mm.

In addition, the present disclosure is not limited to the specific composition of the welding wire forming the weld zone, and, for example, solid wire for welding containing, by weight, C: 0.001 to 0.30%, Si: 1.00% or less (excluding 0%), Mn: 0.50 to 3.00%, P: 0.030% or less (excluding 0%), S: 0.030% or less (excluding 0%), Cr: 1.50% or less (excluding 0%), Mo: 0.60% or less (excluding 0%), Al: less than 0.10% (excluding 0%), Ni: 0.40% or less (excluding 0%), Ti: less than 0.10% (excluding 0%), a balance of Fe, and inevitable impurities may be used. Optionally, the wire composition may further include one or more of Nb: 0.10% or less, V: 0.10% or less, Zr: 0.10% or less, and B: 0.01% or less, or may further include B: 0.01% or less.

In the present disclosure, types of shielding gas used for welding the base material are not particularly limited, and 100% $CO_2$ gas, Ar+20$CO_2$ gas, Ar+10% $CO_2$ gas, Ar+5% $CO_2$ gas, Ar+2% $O_2$ gas, or the like may be used as the shielding gas, but in particular, when Ar+5~20% $CO_2$ are used as the shielding gas, the present disclosure may exhibit remarkable effects. That is, to secure tensile strength of the weld zone without rupture of the weld metal or molten wire in the present disclosure, it is preferable to mix 5 to 20% of $CO_2$ with Ar as a protective gas during welding.

MODE FOR INVENTION

Hereinafter, the present disclosure will be specifically described through the following Examples. However, it should be noted that the following examples are only for describing the present disclosure by illustration, and not intended to limit the right scope of the present disclosure. The reason is that the right scope of the present disclosure is determined by the matters described in the claims and reasonably inferred therefrom.

EXAMPLE

TABLE 1

| Base Mate-rial No. | Alloy Composition (wt %) | | | | | | | | | | |
|---|---|---|---|---|---|---|---|---|---|---|---|
| | C | Si | Mn | P | S | Al | Cr | Mo | Ti | Nb | Remainder |
| 1 | 0.05 | 0.02 | 0.30 | 0.008 | 0.003 | 0.035 | — | — | — | — | Fe |
| 2 | 0.07 | 0.06 | 0.80 | 0.010 | 0.002 | 0.035 | — | — | — | 0.04 | Fe |
| 3 | 0.08 | 0.04 | 1.20 | 0.007 | 0.004 | 0.030 | — | — | 0.06 | 0.05 | Fe |
| 4 | 0.07 | 0.30 | 1.75 | 0.009 | 0.005 | 0.030 | 0.30 | 0.10 | 0.10 | 0.02 | Fe |

TABLE 2

| Wire No. | Alloy Composition (wt %) | | | | | | | | | | | |
|---|---|---|---|---|---|---|---|---|---|---|---|---|
| | C | Si | Mn | P | S | Cu | Ni | Ti | Cr | Mo | Al | B |
| 1 | 0.07 | 0.07 | 1.73 | 0.012 | 0.006 | 0.18 | 0.02 | 0.001 | 0.043 | 0.007 | 0.008 | 0.003 |
| 2 | 0.09 | 0.86 | 1.46 | 0.015 | 0.010 | 0.18 | 0.02 | 0.002 | 0.040 | 0.003 | 0.001 | — |

* The remaining components in Table 2 above may be Fe and inevitable impurities.

Two sheets of each four types of hot-rolled pickled steel sheet base material having alloy compositions as illustrated in Table 1 above, with a thickness of 2.0 mm, a width of 150 mm, a length of 135 mm and 110 mm, and a tensile strength of 380 MPa (steel 1), 540 MPa (steel 2), 670 MPa (steel 3), and 780 MPa (steel 4) were prepared (one pair of 135 mm and 110 mm in length). Solid wires for gas shielded arc welding having alloy compositions illustrated in Table 2 were prepared.

Next, hot-dip galvanized steel sheets were lap joint-welded using each of the solid wires for welding. In this case, pulse DC (shield gas: Ar+20% $CO_2$) was used as a welding method, a flow rate of the shield gas was 201/min, an angle of welding torch was 45° with respect to a vertical direction of the base material, a wire protrusion length was 15 mm, and welding current/voltage/speed conditions were 200 A-20V-80 cm/min. In addition, a gap in a lap joint was set to 0 mm, and a length of the lap joint was set to 25 mm.

Welding was initiated at a position 10 mm from a starting point in a width direction of the weld base material, the welding was performed for a length of 130 mm, and the welding was finished at a position 10 mm from an end point, opposite to the welding start position.

For each weld zone formed by the welding, a microstructure of the weld zone in a cross-sectional portion thereof, perpendicular to a longitudinal direction in a central portion of the weld zone in the longitudinal direction was observed with an optical microscope to confirm a region of welding metal in advance, and the region was cut into a shape of fine chips. Thereafter, with each chip sample, a chemical composition of the welding metal was measured through emission spectrometry using high-frequency inductively coupled plasma (ICP), and was illustrated in Table 3 below.

In addition, factors for specifying the weld bead shape of the weld zone formed by the welding were determined, and values of each of the factors accordingly were illustrated in Table 4 below. Furthermore, values of relationships 2 and 3 were calculated and described.

In Table 4 below, units of a, b1, b2, e1, and e2 are mm, and units of θ1 and θ1 are •, and each thereof is defined as follows.

First, as illustrated in FIG. 1, based on a line to reach a point at which a line connected from a boundary point (weld root) at which an upper plate and a lower plate of a lap joint weld zone meet a weld metal in a direction, perpendicular to the lower plate, and a line connected from an end of the weld metal (weld toe) of the lower plate, meet each other, a represents a length of a line connected vertically from this line to the weld root, and this length may be 77% or more of the base metal thickness (mm).

b1 represents a length from the point at which the line connected from the weld root in a direction, perpendicular to the lower plate, and the line connected from the weld toe, meet each other, to the weld root, and this length may be 99% or more of the base material thickness (mm).

b2 represents a length from the weld toe of the lower plate to the weld root, and this length may be 99% or more of the base material thickness (mm).

e1 represents a length from the point at which the line connected from the weld root in a direction, perpendicular to the lower plate, and the line connected from the weld toe of the lower plate, meet each other, to an end of the weld metal (weld toe) of the upper plate, and this length may be 11% or more of the base metal thickness (mm).

e2 represents a maximum depth of penetration of the weld metal in a vertical direction from a line parallel to an upper reference surface of the lower plate, and this length may be more than 11% of the base material thickness (mm).

As illustrated in FIG. 2, θ1 represents an internal angle formed by a line parallel to an upper reference surface of the lower plate, and a line connecting the weld toe of the lower plate and the weld toe of the upper plate.

As illustrated in FIG. 2, θ2 represents an internal angle formed by a line parallel to a lower reference surface of the upper plate of the lap joint weld zone, and a line connecting the weld root to the weld toe of the upper plate.

In addition, fatigue characteristics of the weld zone formed by welding as described above were measured, and results therefrom are illustrated in Table 5 below. In this case, specific fatigue characteristics measurement method may be as follows. First, a rectangular specimen with a width of 50 mm and a length of 220 mm was collected from a central portion of each welded specimen, and then a rectangular specimen with a width of 50 mm and a length of 40 mm was placed at both ends in the longitudinal direction of the fatigue specimen as a spacer, and attached in two points each using resistance spot welding. This was to ensure that the specimen was uniaxial during the tensile fatigue test. Next, the fatigue lifespan (cycles) was measured by performing a tensile-tensile fatigue test for three load conditions of 10.1 kN, 9.1 kN, and 8.1 kN with the maximum load value, and a ratio of a minimum load to a maximum load (minimum load/maximum load) was 0.1, and a repetitive loading frequency was 15 Hz. Additionally, the minimum load refers to a minimum value of the repetitive load having the above-described constant load application frequency, and the maximum load refers to a maximum value of the repetitive load.

TABLE 3

| Welding Member No. | Base Material No. | Wire No. | Alloy Composition (wt %) of Weld Zone | | | | | | | | | | | | |
|---|---|---|---|---|---|---|---|---|---|---|---|---|---|---|---|
| | | | C | Si | Mn | P | S | Cu | Ni | Ti | Cr | Mo | Al | B | Relationship 3 |
| Inventive Example 1 | 1 | 1 | 0.06 | 0.04 | 1.02 | 0.010 | 0.005 | 0.09 | 0.010 | 0.001 | 0.02 | 0.004 | 0.022 | 0.002 | 0.30 |
| Inventive Example 2 | 2 | 1 | 0.07 | 0.07 | 1.27 | 0.011 | 0.004 | 0.07 | 0.011 | 0.001 | 0.03 | 0.003 | 0.021 | 0.002 | 0.40 |
| Inventive Example 3 | 3 | 1 | 0.08 | 0.06 | 1.47 | 0.010 | 0.005 | 0.08 | 0.009 | 0.031 | 0.01 | 0.002 | 0.019 | 0.003 | 0.43 |
| Inventive Example 4 | 4 | 1 | 0.07 | 0.19 | 1.74 | 0.011 | 0.006 | 0.10 | 0.017 | 0.051 | 0.15 | 0.051 | 0.020 | 0.004 | 0.66 |
| Comparative Example 1 | 1 | 2 | 0.07 | 0.44 | 0.91 | 0.012 | 0.007 | 0.09 | 0.010 | 0.001 | 0.01 | 0.002 | 0.018 | 0.001 | 0.67 |
| Comparative Example 2 | 2 | 2 | 0.08 | 0.46 | 1.13 | 0.013 | 0.006 | 0.08 | 0.009 | 0.001 | 0.02 | 0.003 | 0.018 | 0.001 | 0.75 |
| Comparative Example 3 | 3 | 2 | 0.09 | 0.45 | 1.33 | 0.011 | 0.007 | 0.11 | 0.011 | 0.033 | 0.02 | 0.001 | 0.016 | 0.001 | 0.79 |
| Comparative Example 4 | 4 | 2 | 0.08 | 0.58 | 1.61 | 0.012 | 0.008 | 0.10 | 0.015 | 0.054 | 0.17 | 0.053 | 0.017 | 0.002 | 1.03 |

[Relationship 3] [Si] + 0.25 × ([Mn] + [Cr])

*The remaining components in Table 3 above were Fe and inevitable impurities.

TABLE 4

| Welding Member No. | Base Material No. | Wire No. | Weld Bead Shape | | | | | | | | |
|---|---|---|---|---|---|---|---|---|---|---|---|
| | | | a | b1 | b2 | e1 | e2 | θ1 | θ2 | Relationship 1 | Relationship 2 |
| Inventive Example 1 | 1 | 1 | 1.67 | 2.08 | 4.25 | 1.50 | 0.29 | 20 | 54 | 0.35 | 34 |
| Inventive Example 2 | 2 | 1 | 1.67 | 2.00 | 4.63 | 1.20 | 0.63 | 20 | 64 | 0.26 | 44 |
| Inventive Example 3 | 3 | 1 | 1.67 | 2.08 | 4.58 | 1.00 | 0.50 | 20 | 64 | 0.22 | 44 |
| Inventive Example 4 | 4 | 1 | 1.65 | 2.05 | 4.64 | 1.00 | 0.49 | 19 | 63 | 0.24 | 44 |
| Comparative Example 1 | 1 | 2 | 1.58 | 2.00 | 4.42 | 1.92 | 0.42 | 18 | 47 | 0.43 | 29 |
| Comparative Example 2 | 2 | 2 | 1.67 | 2.08 | 4.42 | 1.67 | 0.50 | 19 | 52 | 0.38 | 33 |
| Comparative Example 3 | 3 | 2 | 1.67 | 2.08 | 4.42 | 1.60 | 0.50 | 19 | 52 | 0.36 | 33 |
| Comparative Example 4 | 4 | 2 | 1.65 | 2.06 | 4.45 | 1.65 | 0.48 | 18 | 50 | 0.37 | 32 |

[Relationship 1] e1/b2

[Relationship 2] θ2 − θ1

TABLE 5

| | Max | Min. | Fatigue Lifespan (Cycles) | | | | | | | |
|---|---|---|---|---|---|---|---|---|---|---|
| | | | Steel Material 1 | | Steel Material 2 | | Steel Material 3 | | Steel Material 4 | |
| No. | Load (kN) | Load (kN) | Comparative Example 1 | Inventive Example 1 | Comparative Example 2 | Inventive Example 2 | Comparative Example 3 | Inventive Example 3 | Comparative Example 4 | Inventive Example 4 |
| 1 | 10.1 | 1.01 | 223,785 | 377,245 | 192,956 | 331,356 | 165,779 | 245,113 | 173,837 | 257,526 |
| 2 | 10.1 | 1.01 | 225,765 | 377,445 | 199,183 | 337,305 | 175,636 | 256,635 | 187,472 | 268,484 |
| 3 | 10.1 | 1.01 | 240,457 | 394,689 | 213,814 | 360,672 | 182,927 | 281,137 | 194,638 | 293,713 |
| 4 | 9.10 | 0.91 | 252,316 | 711,278 | 284,561 | 480,492 | 198,220 | 365,283 | 204,527 | 374,328 |
| 5 | 9.10 | 0.91 | 281,993 | 768,728 | 301,590 | 586,675 | 242,695 | 378,231 | 253,741 | 389,476 |
| 6 | 9.10 | 0.91 | 313,403 | 894,577 | 340,571 | 641,173 | 284,368 | 450,767 | 292,526 | 461,832 |
| 7 | 8.10 | 0.81 | 320,250 | 1,631,919 | 419,836 | 729,238 | 466,703 | 553,012 | 473,495 | 562,139 |
| 8 | 8.10 | 0.81 | 416,102 | 1,791,969 | 476,694 | 890,122 | 491,454 | 701,777 | 503,618 | 713,645 |
| 9 | 8.10 | 0.81 | 864,409 | 2,000,000 | 606,677 | 988,372 | 669,174 | 768,040 | 678,472 | 777,523 |

As illustrated in Tables 1 to 5, the alloy composition of the weld zone was optimally controlled to satisfy relationship 1, and the shape of the weld bead was optimally controlled accordingly, e.g., in Inventive Examples 1 to 4 that satisfies relationships 2 and 3, it can be confirmed that the welding member with relatively excellent fatigue characteristics was obtained. On the other hand, it can be confirmed that Comparative Example 1 to 4 did not satisfy the alloy composition relationship 1 of the weld zone and did not satisfy the weld bead shape relationships 2 and 3, resulting in inferior high-cycle/lower-cycle fatigue lifespan.

The invention claimed is:

1. A welding member having excellent weld fatigue characteristics, comprising:

a base material; and a weld zone, wherein the weld zone includes, by weight, C: 0.001 to 0.30%, Si: 1.00% or less (excluding 0%), Mn: 0.50 to 3.00%, P: 0.030% or less (excluding 0%), S: 0.030% or less (excluding 0%), Cr: 1.50% or less (excluding 0%), Mo: 0.60% or less (excluding 0%), Al: less than 0.10% (excluding 0%), Ni: 0.40% or less (excluding 0%), Ti: less than 0.10% (excluding 0%), a balance of Fe, and inevitable impurities, and satisfies the following relationship 1, wherein a weld bead shape of the weld zone satisfies the following relationship 2, and wherein the weld bead shape of the weld zone further satisfies the following relationship 3:

$$0.30 \leq [\mathrm{Si}] + 0.25 \times ([\mathrm{Mn}] + [\mathrm{Cr}]) \leq 0.66 \qquad \text{[Relationship 1]}$$

where [Si], [Mn], and [Cr] represent amounts in weight percent of each element in parentheses for the weld zone, $$e1/b2 \leq 0.35 \qquad \text{[Relationship 2]}$$

where e1 represents a distance from a point at which a line connected from a weld root of a lap joint weld zone in a direction, perpendicular to a lower plate, and a line connected from a weld toe of the lower plate, meet each other, to a weld toe of an upper plate, and b2 represents a distance from the weld toe of the lower plate to the weld root, and $$\theta 2 - \theta 1 \geq 34° \qquad \text{[Relationship 3]}$$

where, θ1 represents an internal angle formed by a line parallel to an upper reference surface of the lower plate, and a line connecting the weld toe of the lower plate and the weld toe of the upper plate, and θ2 represents an internal angle formed by a line parallel to a lower reference surface of the upper plate of the lap joint weld zone, and a line connecting the weld root to the weld toe of the upper plate.

2. The welding member of claim 1, wherein the weld zone further comprises, by weight, one or more of Nb: 0.10% or less, V: 0.10% or less, Zr: 0.10% or less, and B: 0.01% or less.

3. The welding member of claim 1, wherein the weld zone further comprises, by weight, Cu: 0.50% or less.

4. The welding member of claim 1, wherein the weld zone satisfies a fatigue lifespan of 245,000 cycles or more at a maximum load of 10.1 kN, a ratio of a minimum load to a maximum load of 0.1 and a repetitive loading frequency of 15 Hz.

5. The welding member of claim 1, wherein the base material comprises, by weight, C: 0.04 to 0.18%, Si: 2.0% or less (including 0%), Mn: 0.5 to 3.0%, Cr: 2.0% or less (including 0%), Mo: 2.0% or less (including 0%), Al: 0.01 to 0.10%, P: 0.05% or less (excluding 0%), S: 0.05% or less (excluding 0%), a balance of Fe, and inevitable impurities.

6. The welding member of claim 5, wherein the base material further comprises, by weight, one or more of Ti: 0.20% or less, Nb: 0.10% or less, and Cu: 0.10% or less.

7. The welding member of claim 1, wherein the base material has a thickness of 0.8 to 4.0 mm.

8. An automotive component comprising the welding member of claim 1.

* * * * *